May 25, 1926.
M. BELLO
MANUFACTURE OF CONTAINERS
Filed Dec. 10, 1924
1,585,643
3 Sheets-Sheet 3
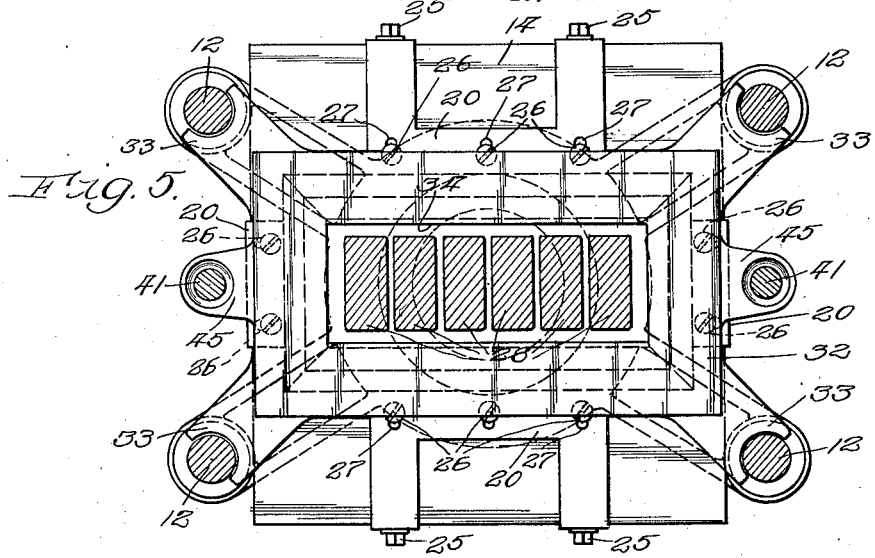
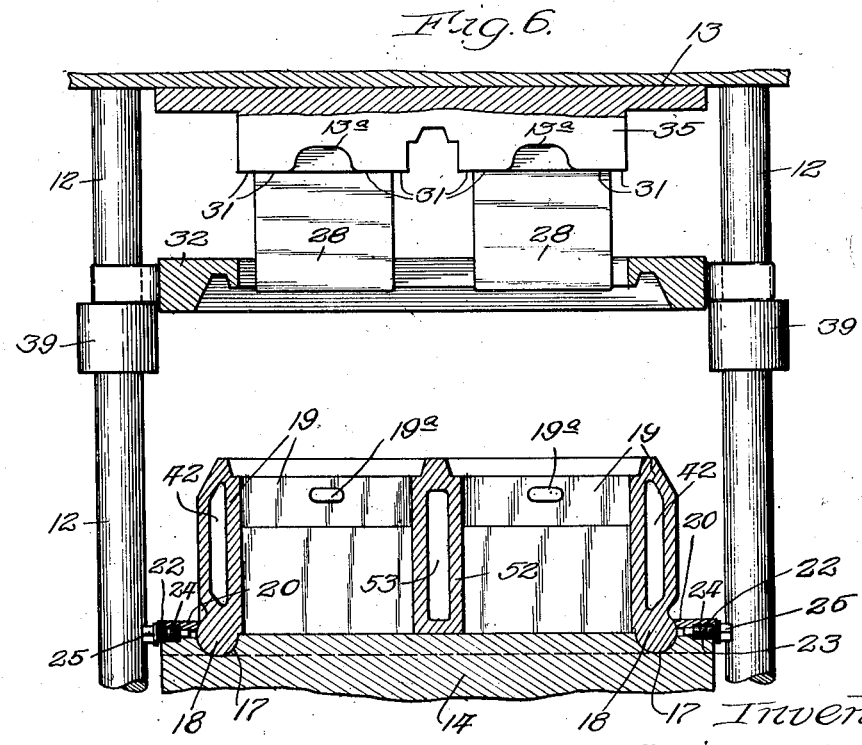
Inventor:
Marino Bello,
By Dynenforth, Lee, Chritton & Wiles
Attys.

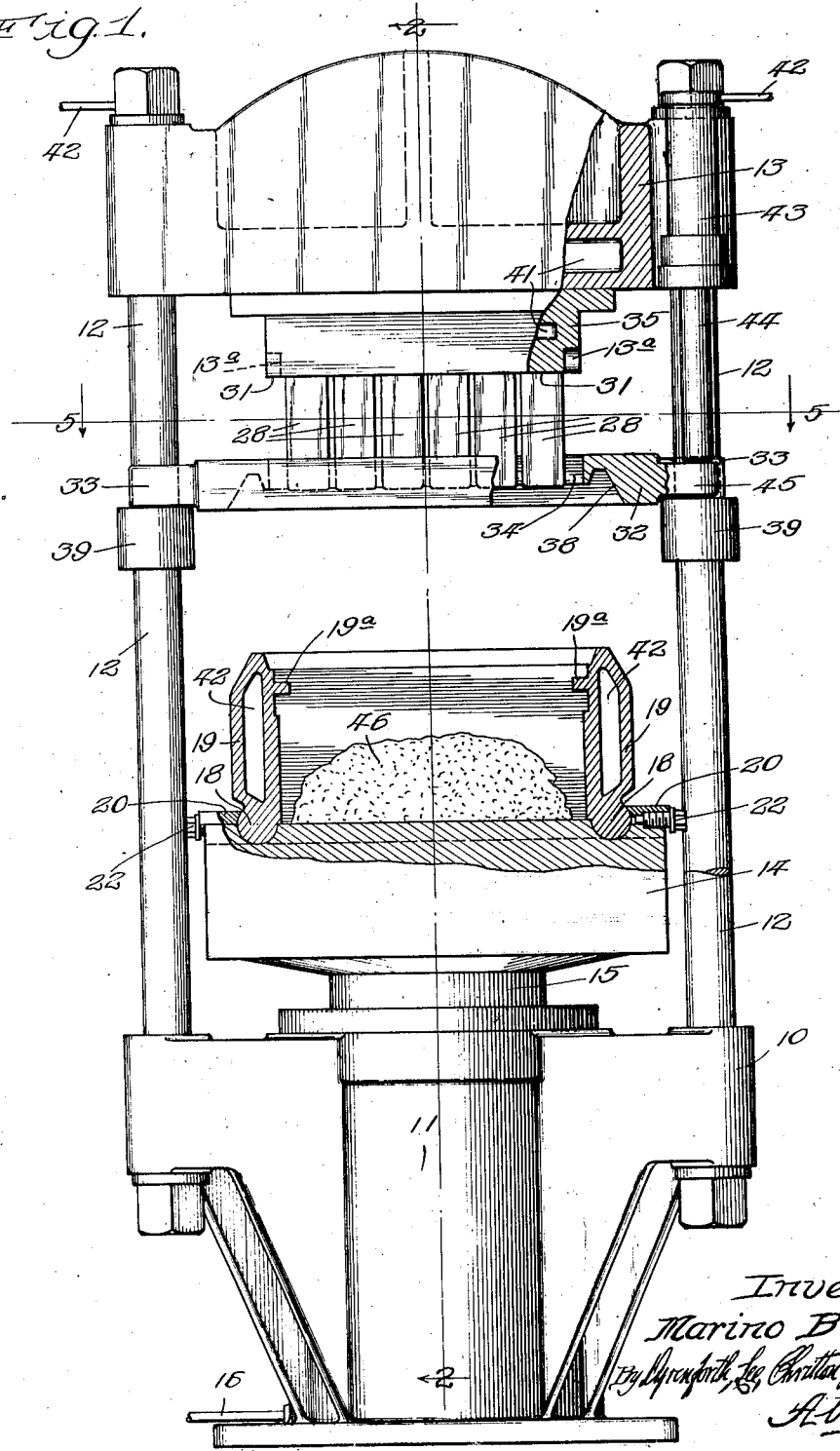

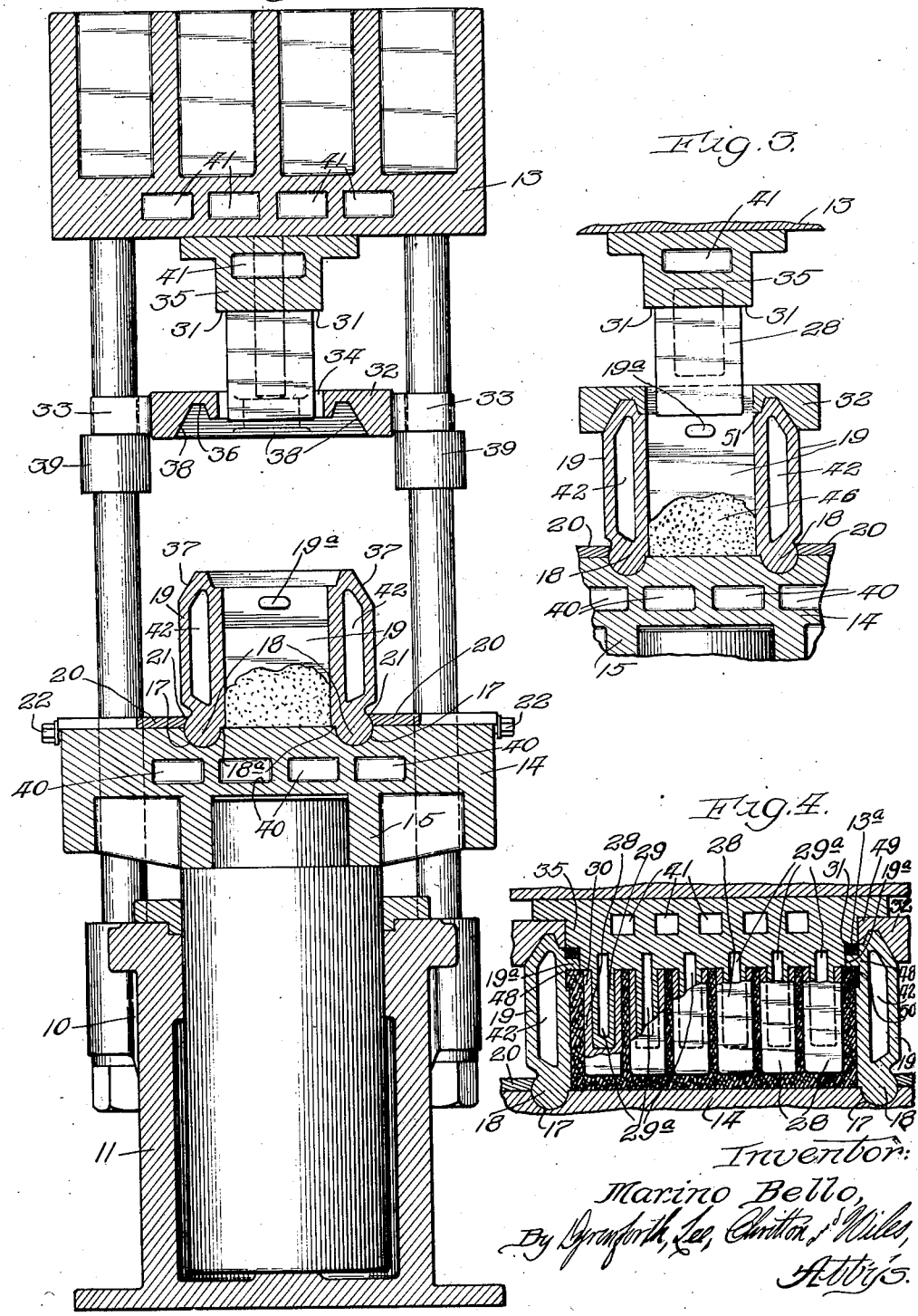

Patented May 25, 1926.

1,585,643

UNITED STATES PATENT OFFICE.

MARINO BELLO, OF HIGHLAND PARK, ILLINOIS, ASSIGNOR TO BELLO BYFIELD CORPORATION, OF WAUKEGAN, ILLINOIS, A CORPORATION OF ILLINOIS.

MANUFACTURE OF CONTAINERS.

Application filed December 10, 1924. Serial No. 754,972.

My invention relates to the manufacture of containers such as, for example, are provided to receive the battery elements of storage batteries and form containers therefor and for the electrolytes. The invention has particular reference to the manufacture of containers which are molded about a core structure and which are formed of material, as for example rubber compound, required to be vulcanized to render the container durable, and more especially to such material supplied to the mold in lump, as distinguished from sheet, form.

My primary objects are to reduce the cost of manufacture of containers, especially battery containers, formed of vulcanizable material; and to provide a machine which shall be of simple and economical construction and by the use of which the cost of manufacturing containers will be materially reduced, particularly where lump material is provided, as stated.

Referring to the accompanying drawings:—

Figure 1 is a view in elevation, with certain parts sectioned and broken away, of a machine constructed in accordance with my invention. Figure 2 is a section taken at the line 2—2 on Fig 1 and viewed in the direction of the arrows. Figure 3 is a sectional view of a detail of the machine showing the side and bottom-forming portions of the mold in one of the positions occupied by them in the operation of the machine for forming a container. Figure 4 is a broken section taken at the line 4—4 on Fig. 2 and viewed in the direction of the arrows, showing the side and bottom portions of the mold in the final positioning thereof in the container-forming operation, with the container shown molded therein. Figure 5 is a plan sectional view taken at the line 5—5 on Fig. 1 and viewed in the direction of the arrows; and Fig. 6, a broken view in sectional elevation of a modification of the machine of the preceding figures.

Referring to the particular, illustrated, embodiment of my invention, the machine comprises a base 10 presenting an upwardly opening cylinder 11, upwardly extending rods 12 disposed in rectangular arrangement and rising from the base 10, and a head 13 surmounting, and rigidly connected, with the rods 12, to extend in spaced relation to the base 10.

The machine also comprises a vertically movable member 14 provided with a depending piston-portion 15 which extends guidingly into the cylinder 11 and is adapted to be forced upwardly therein in any suitable way, as for example by fluid pressure introduced into the bottom of the cylinder 11 through a pipe 16. The member 14 is provided with upwardly-opening, semi-cylindrical, grooves 17 diposed in a rectangular arrangement and into which the lower, cylindrical-shaped, edge-portions 18 of plates 19 constituting the side-wall-forming portions of the mold in which the container is formed, are seated to rock therein, the inner surfaces of the plates 19, adjacent their cylindrical portions 18, presenting shoulders 18ª which form stops preventing the swinging of the plates 19 inwardly at their upper ends beyond the positions shown in Figs. 1, 2 and 4. Means are provided for preventing displacement of the portions 18 of the plates 19 in the grooves 17, these means in the particular arrangement shown, comprising yoke-plates 20, superposed on the member 14 with their inner edges shaped, as represented at 21, to conformingly overlap the cylindrical portions 18 of the plates 19, the plates 20 being adjustable toward and away from each other by means of adjusting screws 22 located between the member 14 and the plates 20 and extending into grooves 23 and 24, respectively, therein, the grooves 23 being threaded and the headed ends 25 of these screws engaging the outer edges of the plates 20, which latter are held in adjusted position by screws 26 which extend through elongated slots 27 in the plates 20 and screw into the member 14. The cylindrical portions 18 are so shaped, as shown, as to abut against the stop-edges 21 of the plates 20 when the mold-plates 19 are swung outwardly to a certain position, namely, that shown in Fig. 3.

It may here be stated that the plates 19 form the side walls of the mold and that portion of the member 14 which is bounded by the grooves 17 forms the bottom of the mold in which the container is formed.

The head 13 carries the depending core-portion of the mold which, in the particular construction shown, comprises six core sections 28 for forming a container presenting six compartments, these core sections being spaced apart as shown. Each core section is shown as formed of a depending bar-like portion 29 and a socketed portion 30 telescoped with the portion 29 and rigidly secured thereto in any desired manner.

The head 13 is provided with horizontal downwardly facing surfaces 31 which surround the core sections adjacent their upper end portions and which form the portions of the mold structure which determine the height of the side walls of the formed container, and with downwardly opening recesses 13$^a$ located at the opposite ends of the core sections and extending above the surfaces 31, as shown, these recesses forming those portions of the mold-cavity in which the handle-portions of the container at its end-walls, are formed.

Surrounding the grouped core-sections is a frame-like member 32 in the form of a centrally apertured plate guidingly supported on the guide rods 12 for up and down movement thereon at lugs 33 on the plate 32, the walls of the opening in this plate and represented at 34 being spaced from the core sections throughout the sides of the latter and of such shape and dimensions as to closely, yet slidingly, fit the rectangular portion 35 of the member 13 disposed directly above the core portions 28 and from which the latter depend, when the member 14 and plate 32 are raised to the position shown in Fig. 4. The plate 32 is provided at all four of its sides on its under-surface with inclined camming grooves 36 which communicate with each other at adjacent ends and are provided for co-operation with the mold plates 19 to force the latter, in the initial upper movement of the head 14 to the position shown in Fig. 4, inwardly to the position shown in this figure, for the purpose hereinafter described, the upper edges of the plates 19 being preferably chamfered, as represented at 37, to provide upwardly and inwardly inclined beveled surfaces, as shown, which ride against the inclined surfaces 38 of the grooves 36 and swing the plates 19 inwardly to the position shown in Fig. 4.

The rods 12 are provided with stops 39 located below the plate 32 which serve to support the latter in a position above the lowermost position assumed by the member 14 and plates 19, as shown in Fig. 2.

The handle-portions of the container are, by preference, provided with finger-holes which are formed by lugs 19$^a$ on the end-wall-forming ones of the plates 19.

The machine shown is adapted not only for the molding of a container of the desired shape, but also for the vulcanizing of the molded material, and to this end is so constructed that the various elements of the structure contacted by the material from which the container is to be formed, are subjected to the desired vulcanizing heat, the machine, to this end, containing steam passages 40, 41 and 42 in the member 14, head 13 and plates 19, respectively, and steam passages 29$^a$ in the cores 28, all of said passages being connected, as by way of example, with any suitable source of steam supply as will be readily understood by those skilled in the art.

The machine shown is provided at opposite sides thereof with vertically disposed cylinders 43 mounted in the head 13 and containing vertically reciprocal pistons 44 which are disposed directly above the lugs 45 provided on the plate 32 and against which the pistons operate upon supplying fluid pressure to the upper ends of the cylinders 43 as through the pipes 42.

In the use of the machine, the member 14 is lowered to the position shown in Figs. 1 and 2 in which position the plates 19 extend entirely below the plate 32. The material from which the container is to be formed and which, by way of example, may be of any suitable vulcanizable rubber compound capable of resisting the action of the acid used in storage batteries, is then introduced, by way of example, in lump form, such a lump being represented at 46, into the space presented between the plates 19 and the upper portion of the member 14, as represented of the lump of material 46, in Fig. 1.

With the material positioned as stated, this material being preferably heated preliminary to its introduction into the space referred to, fluid pressure is introduced into the cylinder 11 which forces the member 14 and the parts carried thereby upwardly. In the upward movement of the parts just referred to, the beveled surfaces 37 of the plates 19 engage the beveled surfaces 38 on the plate 32 which ensure the upright positioning of the plates 19 as shown in the drawings, and in which position these plates meet at their adjacent ends, and, furthermore, prevent outward swinging movement of the plates 19 under the pressure exerted against them by the material 46 in the molding operation. In the continuing upward movement of the member 14, the plate 32 travels upwardly with the plates 19, and as these parts continue their upward movement, to the position shown in Fig. 4, the core sections 28 are engaged by the material 46 which latter, under the pressure exerted against it by the core sections, is caused to be forced into all portions of the mold cavity provided between adjacent core sections and between the latter and the wall and bottom-forming portions of the mold, as shown in Fig. 4 to form a homogenous integral mass in the form of the container desired to be produced, and represented at 47, it being preferred that sufficient fluid pressure be supplied to the cylinders 43 during the upward movement of the member 14 to prevent upward displacement of the plate 32 under the pressure exerted by the material in the mold. In this connection it will be noted that the mold becomes closed at its top by virtue of the relatively tight, yet sliding, fit of the plate 32 about the portion 35 of the member 13, as shown in Fig. 4.

By preference the portions of the mold structure contacted by the vulcanizable material, are subjected to the heating action of steam supplied to the various steam passages referred to, before the molding operation just referred to, the furnishing of the heating medium to these parts, to heat them to a degree for vulcanizing the contents of the mold, being continued, while the molded article is held under the molding pressure until the material has been properly vulcanized.

Following the vulcanizing operation, the operator shuts off the flow of fluid pressure to the cylinder 11 and opens or increases the supply of fluid pressure to the upper ends of the cylinders 43, whereupon the pistons 44 are forced downwardly against the plate 32 with the result of stripping the molded container 47 from the core structure. In this operation the cylinder 11 would be opened to exhaust, the structure comprising the base 14 and the parts carried thereby, including the molded container 47, would descend by gravity after the bond between the container 47 and the core structure, is broken by the pressure applied to the plate 32 through the medium of the pistons 44, the member 14 lowering to the position shown in Figs. 1 and 2, whereupon the operator swings the plates 19 outwardly to release the container 47 for removal from the machine.

Inasmuch as the plates 19 through the lugs 19ª present portions which overlap portions of the container 47, the stripping of the container 47 from the core portion of the machine, rather than the stripping of the container from the portion of the mold structure carried by the member 14, is effected. However, it will be understood, that, if desired, the plates 19 may be provided with other additional, portions which overlap portions of the formed container or the plate 32 may be formed to overlap the container, and augment the action of the lugs 19ª in the stripping action. Furthermore, where the container to be formed is not provided with apertures in handle-portions thereof as described, any suitable overlapping of the walls 19 relative to the formed container, or suitable overlapping of the plate 32 with the formed container, to pull the container from the core, may be provided.

Referring now to the structure shown in Fig. 6, this is the same as that shown in the preceding figures, except that it is provided for the simultaneous forming of a plurality of the containers. To this end the core portions 28 are provided in separate sets, this figure showing the sets in end elevation, these sets co-operating with two lower mold sections for forming two plural-cell containers. Instead of forming all of the upright-wall-forming plates 19 of the mold as hingedly supported structures, as in the structure of the preceding figures, three hinged wall-forming plates 19 for each mold cavity, are provided, and a single upright-wall-forming plate portion for the remaining adjacent sides of these mold cavities, this side wall-forming plate portion being represented at 52, is rigidly secured to the member 14 midway between opposed swinging side wall-forming plates 19, as shown in Fig. 6, it being understood that this stationary plate portion 52 would also contain a steam passage represented at 53.

It will be readily understood from the foregoing that by providing a machine in accordance with my invention containers may be rapidly and economically produced, even when the material from which the containers are to be formed is to be provided in lump form, as compared with sheet form, without requiring handling by the workmen during the molding and vulcanizing operations and without danger of breakage.

While I have illustrated and described certain forms of machines in which my invention may be embodied, I do not wish to be understood as intending to limit it thereto as the same may be variously modified and altered and the invention embodied in other forms, without departing from the spirit of my invention, and in this connection it may be stated that whereas I have described my improved machine as operating upon moldable material provided in lump form, it will be readily understood that the material may be provided in sheet form and in such condition assembled between mold sections 28 and into the side and bottom forming portions of the mold, if desired.

What I claim as new, and desire to secure by Letters Patent, is:

1. In a machine of the character set forth, the combination of receptacle-forming mold and core members, the side walls of said mold member being movable toward and away from each other and said members being relatively movable into and out of a position in which said core extends into said mold member, and a separate member disconnected from and movable relative to each of said first named members operating to force said walls toward each other and to strip said mold member from said core member during the relative movement of said mold and core members.

2. In a machine of the character set forth, the combination of receptacle-forming mold and core members, the side walls of said mold member being movable toward and away from each other and said members being relatively movable into and out of a position in which said core extends into said mold member, and a separate member disconnected from and movable relative to each of said first named members operating to force said walls toward each other, to hold said walls from spreading under the pressure exerted against them in the molding operation and to strip said mold member from said core member during the relative movement of said mold and core members.

3. In a machine of the character set forth, the combination of receptacle-forming mold and core members, the side walls of said mold member being rockably supported to be movable toward and away from each other and said members being relatively movable into and out of a position in which said core extends into said mold member, and a separate member movable relative to each of said first named members operating to force said walls toward each other and to strip said mold member from said core member during the relative movement of said mold and core members.

4. In a machine of the character set forth, the combination of receptacle-forming mold and core members, side walls of said mold member being movable toward and away from each other, said mold member being movable relative to said core member into and out of a position in which said core member extends into said mold member, and a separate member disconnected from and movable relative to each of said first named members operating to force said side walls toward each other and to strip said mold member from said core member during movement of said mold member away from said core member.

5. In a machine of the character set forth, the combination of receptacle-forming mold and core members, side walls of said mold member being movable toward and away from each other, said mold member being movable relative to said core member into and out of a position in which said core member extends into said mold member, and a separate member disconnected from and movable relative to each of said first named members operating to force said side walls toward each other, to hold said walls from spreading under the pressure exerted against them in the molding operation and to strip said mold member from said core member during movement of said mold member away from said core member.

6. In a machine of the character set forth, the combination of receptacle-forming mold and core members, side walls of said mold member being movable toward and away from each other and said mold member being movable into and out of a position in which said core extends into said mold member, a separate member, said separate member and said mold member being relatively movable and said separate member and said core member being relatively movable and means holding said last named member in spaced relation to said mold member when the latter is in lowermost position, said last named member operating, in the movement of said mold member towards said core member, to hold said side walls against outward movement under the pressure exerted against them in the molding operation.

7. In a machine of the character set forth, the combination of receptacle-forming mold and core members, side walls of said mold member being movable toward and away from each other, and said mold member being movable into and out of a position in which said core extends into said mold member, a separate member, said separate member and said mold member being relatively movable and said separate member and said core member being relatively movable and means holding said last named member in spaced relation to said mold member when the latter is in lowermost position, said last named member operating, in the movement of said mold member towards said core member, to force said side walls toward each other.

8. In a machine of the character set forth, the combination of receptacle-forming mold and core members, said mold member being formed of side walls movable toward and away from each other and said members being relatively movable into and out of a position in which said core extends into said mold member, and a separate stripping member disconnected from said mold member, said stripping member and said core member being relatively movable in the stripping operation and said stripping member being adapted to hold the walls of said mold member against spreading under the pressure exerted against them in the molding operation.

9. In a machine of the character set forth, the combination of receptacle-forming mold and core members, said mold member being formed of side walls movable toward and away from each other and said mold member being movable relative to said core member into and out of a position in which said core extends into said mold member, and a separate stripping member movable with said mold member through a portion only of its movement, and said stripping member operating to force said side walls toward each other.

10. In a machine of the character set forth, the combination of receptacle-forming mold and core members, said core member comprising a core and supporting means therefor, the side walls of said mold member being movable toward and away from each other and said members movable into and out of a position in which said core extends into said mold member, and a separate member disconnected from each of said first named members, movable relatively to each thereof and operating to force said walls toward each other, said last named member comprising a frame surrounding said core.

11. In a machine of the character set forth, the combination of receptacle-forming mold and core members, the side walls of said mold member being movable toward and away from each other and overlapping the formed receptacle to effect stripping of the receptacle from the core and said members being relatively movable into and out of a position in which said core extends into said mold member, a separate member operating to force said walls toward each other, said separate member and said mold member being relatively movable and said separate member and said core member being relatively movable, and means to continuously regulate the temperature of the portions of said side walls which overlap the molded receptacle.

12. In a machine of the character set forth, the combination of receptacle-forming mold and core members, the side walls of said mold member being movable toward and away from each other and said members being relatively movable into and out of a position in which said core extends into said mold member, a separately and independently movable member operating to force said walls toward each other, said separate member and said mold member being relatively movable and said separate member and said core member being relatively movable, means operating in the relative movement of said mold and core members away from each other to strip the formed receptacle from the core, and means to continuously regulate the temperature of said last named means.

13. In a machine of the character set forth, the combination of receptacle-forming mold and core members, the side walls of said mold member being movable toward and away from each other and said members being relatively movable into and out of a position in which said core extends into said mold member, means whereby said side walls are completely closed before pressure thereon tending to spread them begins, and means to continuously regulate the temperature of said mold and core members.

14. In a machine of the character set forth, the combination of receptacle-forming mold and core members, the side walls of said mold member being movable toward and away from each other said members being relatively movable into and out of a position in which said core extends into said mold member, a separate member engaging with said walls and operating, in the relative movement of said members to a position in which said core member extends into said mold member, to engage said walls before the latter are subjected to spreading action by the molding operation, and hold them in closed position against spreading during the molding operation, and means to continuously regulate the temperature of said mold and core members.

15. In a machine of the character set forth, the combination of receptacle-forming mold and core members the side walls of said mold member being movable toward and away from each other and said members being relatively movable into and out of a position in which said core extends into said mold member, a separate member operating to force said walls toward each other, said separate member and said mold member being relatively movable, and said separate member and said core member being relatively movable, said side walls having portions which overlap portions of the molded receptable and produce stripping of the receptacle relative to the core member in the relative movement of said members away from each other, and means to continuously control the temperature of said overlapping portions.

16. In a machine of the character set forth, the combination of receptacle-forming mold and core members, the side walls of said mold member being movable toward and away from each other and said members being relatively movable into and out of a position in which said core extends into said mold member, a separate stripping member disconnected from said mold member, said stripping member and said core member being relatively movable in the stripping operation and said stripping member operating to force said side walls toward each other, and means for subjecting the contents of the mold to vulcanizing heat while under the pressure exerted in the molding operation.

17. In a machine of the character set forth, the combination of receptacle-forming mold and core members said mold member being formed of side walls movable toward and away from each other, said mold member being movable relative to said core member into and out of a position in which said core extends into said mold member, a separate stripping member disconnected from and movable with said mold member through a portion only of its movement, said stripping member operating to force said side walls toward each other, and means for subjecting the contents of the mold to vulcanizing heat while under the pressure exerted in the molding operation.

18. In a machine of the character set forth, the combination of receptacle-forming mold and core members, said mold member being formed of side walls movable toward and away from each other, and said members being relatively movable into and out of a position in which said core extends into said mold member, and a separate stripping member disconnected from said mold member, said stripping member and said core member being relatively movable in the stripping operation, and said stripping member operating to force said side walls toward each other.

19. In a machine of the character set forth, the combination of mold and core members, said mold member being formed of side walls movable toward and away from each other and said members being relatively movable into and out of a position in which said core extends into said mold member, and a separate member for engagement with said side walls and disconnected from said mold member, said separate member and said mold member being relatively movable and said separate member and said core member being relatively movable.

MARINO BELLO.